US012070943B2

(12) United States Patent
Toyofuku et al.

(10) Patent No.: US 12,070,943 B2
(45) Date of Patent: Aug. 27, 2024

(54) DRIVE WAVEFORM DETERMINATION METHOD, STORAGE MEDIUM, LIQUID DISCHARGE APPARATUS, AND DRIVE WAVEFORM DETERMINATION SYSTEM

(71) Applicant: SEIKO EPSON CORPORATION, Tokyo (JP)

(72) Inventors: Atsushi Toyofuku, Shiojiri (JP); Toshiro Murayama, Fujimi-Machi (JP)

(73) Assignee: Seiko Epson Corporation, Tokyo (JP)

( * ) Notice: Subject to any disclaimer, the term of this patent is extended or adjusted under 35 U.S.C. 154(b) by 143 days.

(21) Appl. No.: 17/454,402

(22) Filed: Nov. 10, 2021

(65) Prior Publication Data

US 2022/0153022 A1 May 19, 2022

(30) Foreign Application Priority Data

Nov. 13, 2020 (JP) ................................ 2020-189263

(51) Int. Cl.
*B41J 29/38* (2006.01)
*B41J 2/045* (2006.01)

(52) U.S. Cl.
CPC ....... *B41J 2/04588* (2013.01); *B41J 2/04581* (2013.01)

(58) Field of Classification Search
CPC ... B41J 2/0456; B41J 2/04581; B41J 2/04588
See application file for complete search history.

(56) References Cited

U.S. PATENT DOCUMENTS

2003/0048331 A1* 3/2003 Takahashi ............ B41J 2/04588 347/57
2004/0189732 A1* 9/2004 Usuda .................... B41J 2/0456 347/19
2010/0238218 A1* 9/2010 Matsushita .......... B41J 2/14274 29/825
2018/0250931 A1* 9/2018 Sakamoto ............ B41J 2/14233

FOREIGN PATENT DOCUMENTS

JP 2010-131910 A 6/2010

* cited by examiner

*Primary Examiner* — Lam S Nguyen
(74) *Attorney, Agent, or Firm* — WORKMAN NYDEGGER

(57) ABSTRACT

The drive waveform determination method includes a first step of setting a condition of the first discharge characteristic, a second step of acquiring the first discharge characteristic and the second discharge characteristic that are measured when a candidate waveform is used as a waveform of the drive pulse, a third step of determining whether the first discharge characteristic meets the condition, and a fourth step of, when it is determined in the third step that the condition is met, evaluating a candidate waveform by performing a superior comparison using the second discharge characteristic. The waveform of the drive pulse is determined by an optimization process in which at least the second step, the third step, and the fourth step are repeated.

19 Claims, 9 Drawing Sheets

DRIVE WAVEFORM DETERMINATION METHOD, STORAGE MEDIUM, LIQUID DISCHARGE APPARATUS, AND DRIVE WAVEFORM DETERMINATION SYSTEM

The present application is based on, and claims priority from JP Application Serial Number 2020-189263, filed Nov. 13, 2020, the disclosure of which is hereby incorporated by reference herein in its entirety.

BACKGROUND

1. Technical Field

The present disclosure relates to a drive waveform determination method, a storage medium, a liquid discharge apparatus, and a drive waveform determination system.

2. Related Art

In a typical liquid discharge apparatus such as an ink jet printer, a liquid, such as ink, is discharged from nozzles by application of drive pulses to drive elements, such as piezoelectric elements. At this point, the waveform of a drive pulse is determined such that the discharge characteristics of ink from nozzles are desired characteristics.

The techniques disclosed in JP-A-2010-131910 measure ejecting characteristics by changing a plurality of parameters for determining a drive waveform, which is the waveform of drive pulses, and provide a determination based on results of the measurement to find out a parameter to be actually used for the drive waveform.

In the techniques disclosed in JP-A-2010-131910, the drive waveform is determined manually by the user. This raises a problem in that an excessive burden is imposed on the user. In view of this, it is conceivable in order to reduce the burden on the user that the drive waveform be automatically determined.

However, if the techniques disclosed in the document mentioned above are simply automated, it is difficult in reality to determine a drive waveform with which all of a plurality of ejecting characteristics are in the best states.

SUMMARY

According to a first aspect of the present disclosure, there is provided a drive waveform determination method for determining, using a first discharge characteristic and a second discharge characteristic different from the first discharge characteristic, a waveform of a drive pulse to be applied to a drive element provided in a liquid discharge head that discharges a liquid. This drive waveform determination method includes a first step of setting a condition of the first discharge characteristic, a second step of acquiring the first discharge characteristic and the second discharge characteristic that are measured when a candidate waveform is used as the waveform of the drive pulse, a third step of determining whether the first discharge characteristic meets the condition, and a fourth step of, when it is determined in the third step that the condition is met, evaluating the candidate waveform by performing a superior comparison using the second discharge characteristic. The waveform of the drive pulse is determined by an optimization process in which at least the second step, the third step, and the fourth step are repeated.

According to a second aspect of the present disclosure, there is provided a drive waveform determination method for determining, using a first discharge characteristic, a waveform of a drive pulse to be applied to a drive element provided in a liquid discharge head that discharges a liquid. This drive waveform determination method includes a first step of setting a condition of the first discharge characteristic, a second step of acquiring the first discharge characteristic measured when a candidate waveform is used as the waveform of the drive pulse, a third step of determining whether the first discharge characteristic meets the condition, and a fourth step of, when it is determined in the third step that the condition is met, evaluating the candidate waveform by performing a search using the first discharge characteristic. The waveform of the drive pulse is determined by using an evaluation result of the fourth step.

According to a third aspect of the present disclosure, there is provided a non-transitory computer-readable storage medium storing a drive waveform determination program. The drive waveform determination program includes causing a computer to execute the drive waveform determination method according to the first or second aspect of the present disclosure.

According to a fourth aspect of the present disclosure, there is provided a liquid discharge apparatus that includes a liquid discharge head including a drive element for discharging a liquid, and a processing circuit configured to perform a process of determining, using a first discharge characteristic and a second discharge characteristic different from the first discharge characteristic, a waveform of a drive pulse to be applied to the drive element. The processing circuit performs a first step of setting a condition of the first discharge characteristic, a second step of acquiring the first discharge characteristic and the second discharge characteristic that are measured when a candidate waveform is used as the waveform of the drive pulse, a third step of determining whether the first discharge characteristic meets the condition, and a fourth step of, when it is determined in the third step that the condition is met, evaluating the candidate waveform by performing an optimization using the second discharge characteristic. The processing circuit determines the waveform of the drive pulse by an optimization process in which at least the second step, the third step, and the fourth step are repeated.

According to a fifth aspect of the present disclosure, there is provided a drive waveform determination system that includes a liquid discharge head including a drive element for discharging a liquid, and a processing circuit configured to perform a process of determining, using a first discharge characteristic and a second discharge characteristic different from the first discharge characteristic, a waveform of a drive pulse to be applied to the drive element. The processing circuit performs a first step of setting a condition of the first discharge characteristic, a second step of acquiring the first discharge characteristic and the second discharge characteristic that are measured when a candidate waveform is used as the waveform of the drive pulse, a third step of determining whether the first discharge characteristic meets the condition, and a fourth step of, when it is determined in the third step that the condition is met, evaluating the candidate waveform by performing an optimization using the second discharge characteristic. The processing circuit determines the waveform of the drive pulse by an optimization process in which at least the second step, the third step, and the fourth step are repeated.

DESCRIPTION OF EXEMPLARY EMBODIMENTS

Figure 1:
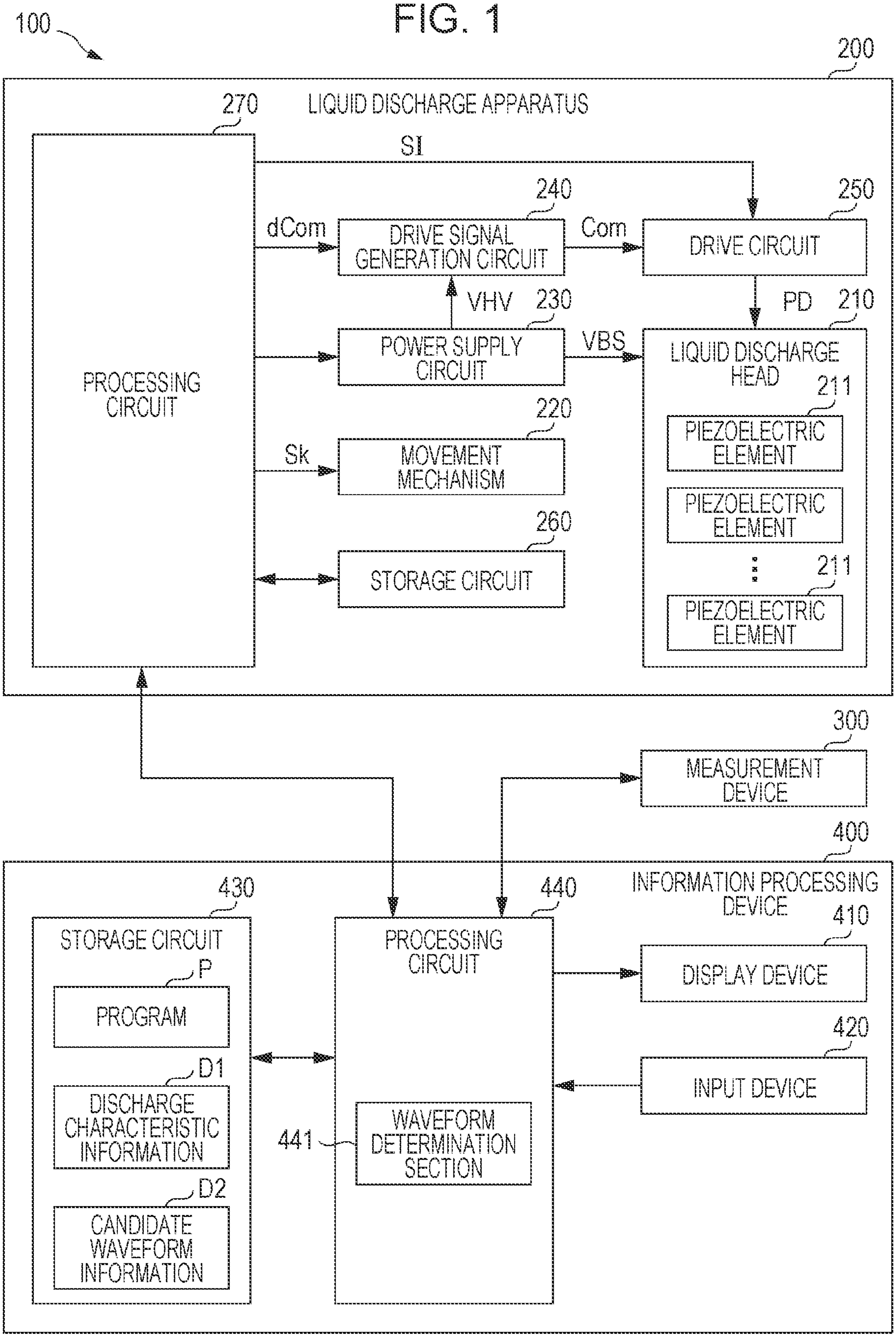
FIG. 1 is a diagram illustrating an exemplary configuration of a drive waveform determination system according to a first embodiment.

Embodiments according to the present disclosure will be described below with reference to the accompanying drawings. The dimensions and scales of elements in the drawings are appropriately different from those of actual elements, and some of the elements are schematically illustrated for ease of understanding. The scope of the present disclosure is not limited to these forms as long as there is no description in the following sections to the effect that the present disclosure is particularly limited.

1. First Embodiment

1-1. Outline of Drive Waveform Determination System 100

FIG. 1 is a diagram illustrating an exemplary configuration of a drive waveform determination system 100 according to a first embodiment. The drive waveform determination system 100 automatically determines the waveform of drive pulses PD that is to be used in discharging ink, which is an exemplary liquid.

As illustrated in FIG. 1, the drive waveform determination system 100 includes a liquid discharge apparatus 200, a measurement device 300, and an information processing device 400, which is an example of "computer". These devices will be sequentially described below with reference to FIG. 1.

1-1a. Liquid Discharge Apparatus 200

The liquid discharge apparatus 200 is a printer that performs printing on a printing medium by an ink jet method. The printing medium may be any medium on which the liquid discharge apparatus 200 is able to perform printing. There is no limitation on the printing medium. Examples of the printing medium include various types of paper, various clothes, and various films. The liquid discharge apparatus 200 may either be a serial printer or a line printer.

As illustrated in FIG. 1, the liquid discharge apparatus 200 includes a liquid discharge head 210, a movement mechanism 220, a power supply circuit 230, a drive signal generation circuit 240, a drive circuit 250, a storage circuit 260, and a processing circuit 270.

The liquid discharge head 210 discharges ink toward a printing medium. FIG. 1 illustrates a plurality of piezoelectric elements 211, which are examples of "drive element", as components of the liquid discharge head 210. The liquid discharge head 210 includes, in addition to the piezoelectric elements 211, cavities for containing ink and nozzles communicating with the cavities, both of which are not illustrated in the drawings. Each of the cavities is provided with a corresponding one of the piezoelectric elements 211. The piezoelectric element 211 changes the pressure of the corresponding cavity, thereby causing ink to be discharged from a nozzle for use with this cavity. Instead of the piezoelectric element 211, a heater that heats ink in a cavity may be used as the drive element.

In the example illustrated in FIG. 1, the number of the liquid discharge heads 210 included in the liquid discharge apparatus 200 is one; however, this number may be two or more. In this case, for example, two or more liquid discharge heads 210 are unitized into one. For the case where the liquid discharge apparatus 200 is of a serial type, the liquid discharge head 210 or a unit including two or more liquid discharge heads 210 is used such that a plurality of nozzles are distributed over part in the width direction of a printing medium. For the case where the liquid discharge apparatus 200 is of a line type, a unit including two or more liquid discharge heads 210 is used such that a plurality of nozzles are distributed across the entire area in the width direction of a printing medium.

The movement mechanism 220 changes a relative position between the liquid discharge head 210 and a printing medium. More specifically, for the case where the liquid discharge apparatus 200 is of the serial type, the movement mechanism 220 includes a transport mechanism that transports a printing medium in a predetermined direction, and a movement mechanism that repetitively moves the liquid discharge head 210 along the axis perpendicular to the transport direction of the printing medium. For the case where the liquid discharge apparatus 200 is of the line type, the movement mechanism 220 includes a transport mechanism that transports a printing medium in a direction intersecting the longitudinal direction of the unit including two or more liquid discharge heads 210.

The power supply circuit 230 is supplied with power from a commercial power supply (not illustrated) and generates various predetermined potentials. The various generated potentials are suitably supplied to sections of the liquid discharge apparatus 200. For example, the power supply circuit 230 generates a power supply potential VHV and an offset potential VBS. The offset potential VBS is supplied to the liquid discharge head 210 and other sections. The power supply potential VHV is supplied to the drive signal generation circuit 240 and other sections.

The drive signal generation circuit 240 is a circuit that generates a drive signal Com for driving each piezoelectric element 211 included in the liquid discharge head 210. Specifically, the drive signal generation circuit 240 includes, for example, a digital-to-analog (DA) conversion circuit and an amplifying circuit. In the drive signal generation circuit 240, the DA conversion circuit converts a waveform specification signal dCom described later from the processing circuit 270 from the digital signal to an analog signal, and the amplifying circuit amplifies the analog signal using a power supply potential VHV from the power supply circuit 230, thereby generating the drive signal Com. A signal of a waveform actually supplied to the piezoelectric element 211, among waveforms included in the drive signal Com, is the drive pulse PD. The drive pulse PD will be described later.

In accordance with a control signal SI described later, the drive circuit 250 switches between supplying and not supplying at least some of the waveforms included in the drive signal Com, as the drive pulse PD, to each of the plurality of piezoelectric elements 211. The drive circuit 250 is an integrated circuit (IC) chip that outputs a drive signal for driving each piezoelectric element 211 and a reference voltage.

The storage circuit 260 stores various programs executed by the processing circuit 270 and various types of data, such as print data, processed by the processing circuit 270. The storage circuit 260 includes, for example, semiconductor memories that are one or both of a volatile memory, such as a random access memory (RAM), and a nonvolatile memory, such as a read-only memory (ROM), an electrically erasable programmable ROM (EEPROM), or a programmable ROM (PROM). The print data is, for example, supplied from the information processing device 400. The storage circuit 260 may be configured as part of the processing circuit 270.

The processing circuit 270 has a function of controlling operations of sections of the liquid discharge apparatus 200 and a function of processing various types of data. The processing circuit 270 includes, for example, one or more processors, such as central processing units (CPUs). The processing circuit 270 may include a programmable logic device, such as a field-programmable gate array (FPGA), instead of or in addition to the CPUs.

The processing circuit 270 controls operations of sections of the liquid discharge apparatus 200 by executing programs stored in the storage circuit 260. The processing circuit 270 generates control signals Sk and SI, the waveform specification signal dCom, and other signals as signals for controlling operations of sections of the liquid discharge apparatus 200.

The control signal Sk is a signal for controlling the drive of the movement mechanism 220. The control signal SI is a signal for controlling the drive of the drive circuit 250. Specifically, the control signal SI specifies, for each predetermined unit period, whether the drive circuit 250 is to supply the drive signal Com from the drive signal generation circuit 240 as the drive pulse PD to the liquid discharge head 210. This specification specifies, for example, the ink amount discharged from the liquid discharge head 210. The waveform specification signal dCom is a digital signal for defining the waveform of the drive signal Com generated in the drive signal generation circuit 240.

1-1b. Measurement Device 300

The measurement device 300 is a device for measuring discharge characteristics of ink from the liquid discharge head 210 when the drive pulse PD is actually used. Examples of the discharge characteristics include a discharge velocity, a discharge angle, a discharge amount, the number of satellites, and stability. The discharge characteristics of ink from the liquid discharge head 210 may be referred to below simply as discharge characteristics.

The measurement device 300 in the present embodiment is an imaging device that captures an image of the state of flying ink discharged from the liquid discharge head 210. Specifically, the measurement device 300 includes, for example, an imaging optical system and an imaging element. The imaging optical system is an optical system including at least one imaging lens, and may include various optical elements, such as a prism, or may include a zoom lens, a focus lens, or another lens. The imaging element is, for example, a charge coupled device (CCD) image sensor or a complementary metal oxide semiconductor (CMOS) image sensor. Measurement of discharge characteristics using an image captured by the measurement device 300 will be described in detail later.

Although the measurement device 300 captures an image of flying ink in the present embodiment, measurement of the discharge characteristics, such as an amount of ink discharged from the liquid discharge head 210, may be based on a result of capture of ink that has landed on, for example, a printing medium. The measurement device 300 may be any device capable of obtaining a measurement result in accordance with the discharge characteristics of ink from the liquid discharge head 210, and is not limited to the imaging device. For example, the measurement device 300 may be an electronic force balance that measures the quality and quantity of ink discharged from the liquid discharge head 210. Furthermore, as information sources for measuring discharge characteristics of ink from the liquid discharge head 210, a result of detection of waveforms of the residual vibrations generated with the liquid discharge head 210, as well as information from the measurement device 300, may be used. The residual vibrations are vibrations remaining in the ink flow channel in the liquid discharge head 210 after the piezoelectric element 211 has been driven and, for example, are detected as a voltage signal from the piezoelectric elements 211. The discharge characteristics may be characteristics regarding a discharge state of ink from the liquid discharge head 210 and constitute a concept including, for example, a drive frequency of the liquid discharge head 210 in addition to the characteristics mentioned above.

1-1c. Information Processing Device 400

The information processing device 400 is a computer that controls operations of the liquid discharge apparatus 200 and the measurement device 300. The information processing device 400 is connected in a wireless or wired manner to each of the liquid discharge apparatus 200 and the measurement device 300 so as to enable communication between the information processing device 400 and the liquid discharge apparatus 200 and to enable communication between the information processing device 400 and the measurement device 300. This connection may involve communication networks including the Internet.

The information processing device 400 in the present embodiment is an example of a computer that executes a program P, which is an example of the drive waveform determination program. The program P causes the information processing device 400 to perform the drive waveform determination method for determining the waveform of the drive pulse PD to be applied to the piezoelectric elements 211 provided in the liquid discharge head 210 that discharges ink, which is an exemplary liquid.

As illustrated in FIG. 1, the information processing device 400 includes a display device 410, an input device 420, a storage circuit 430, and a processing circuit 440. These components are communicably connected to each other.

The display device 410 displays various images under control of the processing circuit 440. The display device 410 includes, for example, any type of display panel, such as a liquid display panel or an organic electro-luminescent (EL) display panel. The display device 410 may be provided outside the information processing device 400. The display device 410 may be a component of the liquid discharge apparatus 200.

The input device 420 is a device that receives an operation from a user. For example, the input device 420 includes a pointing device such as a touch pad, a touch panel, or a mouse. The input device 420, when including a touch panel, may also be used as the display device 410. The input device 420 may be provided outside the information processing device 400. The input device 420 may be a component of the liquid discharge apparatus 200.

The storage circuit 430 is a device that stores various programs executed by the processing circuit 440 and various types of data processed by the processing circuit 440. The storage circuit 430 includes, for example, a hard disk drive or a semiconductor memory. All or part of the storage circuit 430 may be provided in, for example, a storage device or a server outside the information processing device 400.

In the storage circuit 430 in the present embodiment, the program P, discharge characteristic information D1, and candidate waveform information D2 are stored. The discharge characteristic information D1 is information regarding results of measurement of characteristics of ink from the liquid discharge head 210. This measurement is actually performed using the measurement device 300 described above. The discharge characteristic information D1 includes information regarding measurement conditions, such as waveforms and temperatures used for measurement, as appropriate, in addition to information indicating results of measurement using the measurement device 300.

The candidate waveform information D2 is information regarding candidate waveforms each of which is stored as a “temporary waveform” among “candidate waveforms”, which are the waveforms of the drive pulse PD used for measurement by the measurement device 300. The temporary waveform is determined through evaluation in a waveform determination section 441 described later. For the candidate waveform information D2, in order not to include a candidate waveform that is not a temporary waveform, or in order to allow the candidate waveform that is not a temporary waveform to be distinguished from a candidate waveform that is a temporary waveform, even though these candidate waveforms may be included in the candidate waveform information D2, for example, an identifier such as a flag is added to one of these candidate waveforms. The discharge characteristic information D2 appropriately includes, in addition to the information regarding temporary waveforms, for example, information indicating correspondences between this information and information regarding discharge characteristics included in the discharge characteristic information D1 mentioned above. Some or all of the program P, the discharge characteristic information D1, and the candidate waveform information D2 may be provided in, for example, a storage device or a server outside the information processing device 400.

The processing circuit 440 is a device having a function of controlling sections of the information processing device 400, the liquid discharge apparatus 200, and the measurement device 300 and a function of processing various types of data. The processing circuit 440 includes, for example, a processor, such as a CPU. The processing circuit 440 may include a single processor or may include a plurality of processors. Some or all of the functions of the processing circuit 440 may be implemented by hardware such as a digital signal processor (DSP), an application specific integrated circuit (ASIC), a programmable logic device (PLD), and an FPGA.

The processing circuit 440 functions as the waveform determination section 441 by reading the program P from the storage circuit 430 and executing the program P.

The waveform determination section 441 drives the liquid discharge head 210 using a candidate waveform of the drive pulse PD, causes the measurement device 300 to measure discharge characteristics during the driving, and determines the waveform of the drive pulse PD using a result of the measurement. As the discharge characteristics, two or more discharge characteristics are used. The waveform determination section 441 sets conditions of some of the two or more discharge characteristics. If the candidate waveform meets the conditions, the waveform determination section 441 evaluates the candidate waveform by performing a superior/dominant comparison using the remaining discharge characteristics and determines the waveform of the drive pulse PD using a result of the evaluation.

In the present embodiment, as the two or more discharge characteristics, a first discharge characteristic, which is some of the discharge characteristics, and a second discharge characteristic and a third discharge characteristic, which are the remaining discharge characteristics, are used. These types of discharge characteristics are appropriately selected from the types of discharge characteristics mentioned above. In the present embodiment, however, the first discharge characteristic is one or both of the discharge amount and the discharge velocity, and the second discharge characteristic or the third discharge characteristic is the discharge angle, the amount of satellites produced, or a drive frequency. The waveform determination section 441 stores a candidate waveform in accordance with a result of the evaluation as a temporary waveform included in the candidate waveform information D2 in the storage circuit 430, and determines the waveform of the drive pulse PD by using the temporary waveform. Considerations regarding determination of the waveform of the drive pulse PD will be described in detail below.

1-2. Example of Waveform of Drive Pulse PD

Figure 2:
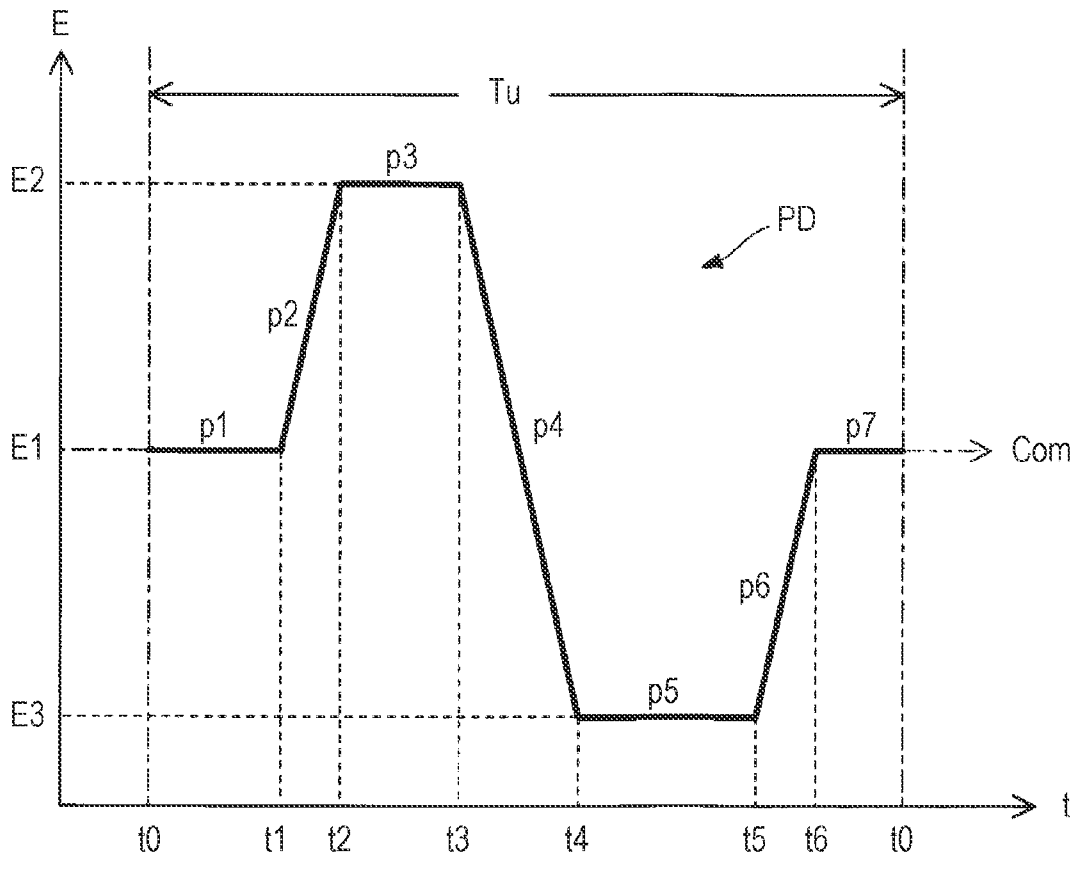
FIG. 2 is a graphical representation illustrating an example of a waveform of a drive pulse.

FIG. 2 is a graphical representation illustrating an example of a waveform of the drive pulse PD. In FIG. 2, a change over time in the drive pulse PD, that is, a voltage waveform of the drive pulse PD is illustrated. The waveform of the drive pulse PD is any form including but not limited to the example illustrated in FIG. 2.

As illustrated in FIG. 2, the drive pulse PD is included for each unit period Tu in the drive signal Com. In the example illustrated in FIG. 2, a potential E of the drive pulse PD rises from a reference potential E1 to a potential E2, then drops to a potential E3 lower than the potential E1, and then returns to the potential E1.

More specifically, the potential E of the drive pulse PD is first maintained at the potential E1 over a period from a timing t0 to a timing t1 and then rises to the potential E2 over a period from the timing t1 to a timing t2. Then, after the potential E of the drive pulse PD is maintained at the potential E2 over a period from the timing t2 to a timing t3, the potential E drops to a potential E3 over a period from the timing t3 to a timing t4. Thereafter, after the potential E is maintained at the potential E3 over a period from the timing t4 to a timing t5, the potential E rises to the potential E1 over a period from the timing t5 to a timing t6.

The drive pulse PD with such a waveform enlarges a pressure chamber of the liquid discharge head 210 in the period from the timing t1 to the timing t2 and abruptly decreases the volume of the pressure chamber in the period from the timing t3 to the timing t4. Such a change in the volume of the pressure chamber causes a portion of ink in the pressure chamber to be discharged as liquid droplets from the nozzles.

The waveform of the drive pulse PD as described above may be represented as a function using parameters p1, p2, p3, p4, p5, p6, and p7 provided for the periods mentioned above. When the waveform of the drive pulse PD is defined using the function, changing each parameter enables adjustment of the waveform of the drive pulse PD. Adjustment of the waveform of the drive pulse PD enables adjustment of discharge characteristics of ink from the liquid discharge head 210.

1-3. Measurement of Discharge Characteristics of Ink

The waveform determination section 441 of the information processing device 400 described above actually uses the drive pulse PD to drive the liquid discharge head 210, and measures the discharge characteristics of ink from the liquid discharge head 210 by using imaging information from the measurement device 300. A result of the measurement is stored as the discharge characteristic information D1 in the storage circuit 430.

Figure 3:
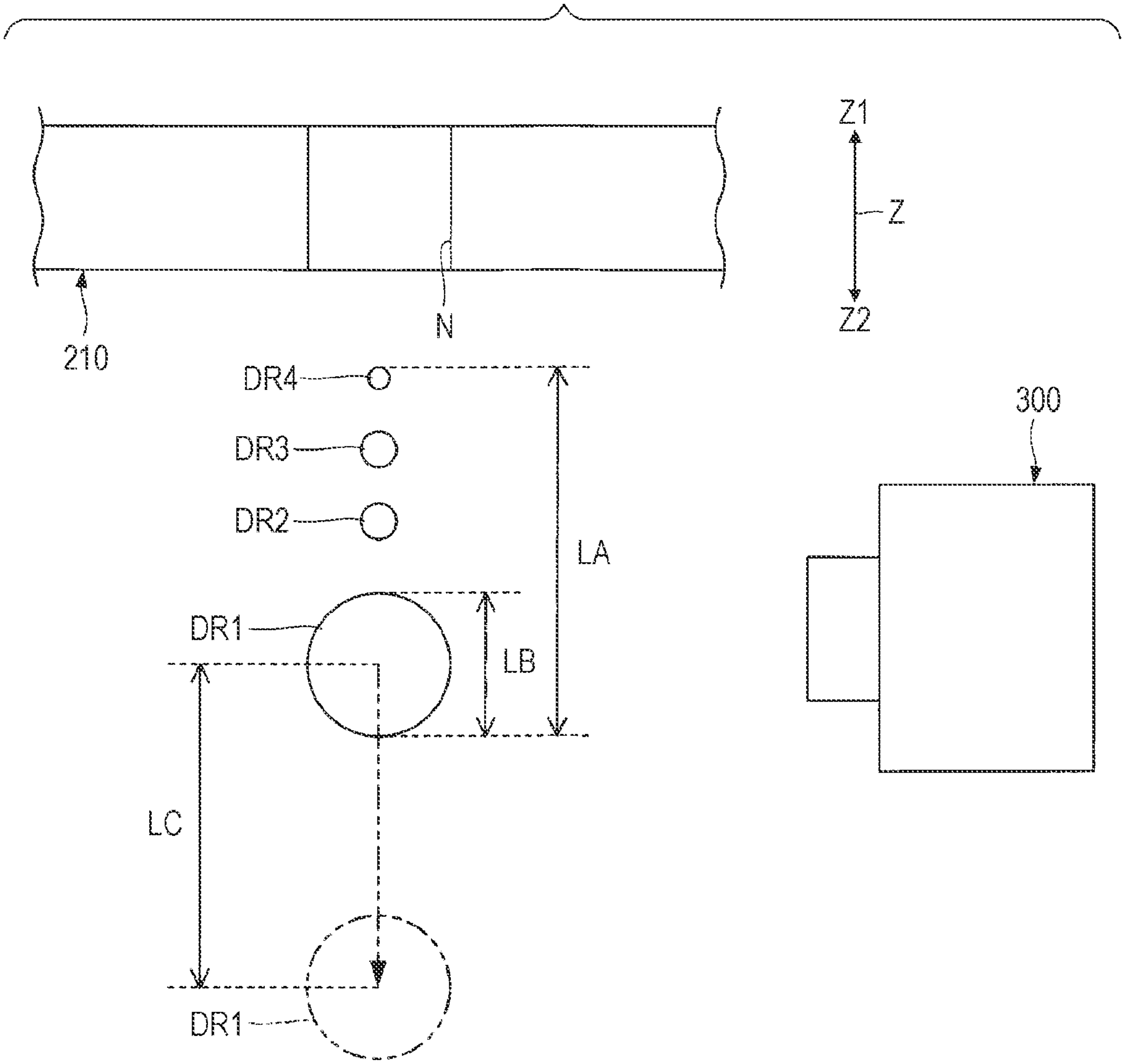
FIG. 3 illustrates measurement of discharge characteristics of ink.

FIG. 3 illustrates measurement of discharge characteristics of ink. As illustrated in FIG. 3, the measurement device 300 in the present embodiment captures an image of flying states of liquid droplets DR1, DR2, DR3, and DR4 of ink discharged from the nozzles N of the liquid discharge head 210 from a direction perpendicular to or crossing the discharge direction.

The liquid droplet DR1 is the main liquid droplet. In contrast, each of the liquid droplets DR2, DR3, and DR4 is a liquid droplet, called a satellite, having a smaller diameter than the liquid droplet DR1 and is formed following the liquid droplet DR1 in association with the formation of the liquid droplet DR1. The presence or absence of formation of the liquid droplets DR2, DR3, and DR4, and, for example, the numbers or the sizes of these liquid droplets vary in accordance with the waveform of the drive pulse PD described above.

The discharge amount of ink from the liquid discharge head 210 is obtained, for example, by calculation based on a diameter LB of the liquid droplet DR1 using a captured image by the measurement device 300. The discharge velocity of ink from the liquid discharge head 210 is obtained, for example, by calculation based on a travel distance LC of the liquid droplet DR1 for a predetermined period of time when images of the liquid droplet DR1 are successively taken and based on the predetermined period of time. In FIG. 3, the liquid droplet DR1 located after the predetermined period time is indicated by a dash-dot-dot line. The aspect ratio (LA/LB) of ink from the liquid discharge head 210 may be calculated as a discharge characteristic of ink. The discharge angle of ink from the liquid discharge head 210 may be determined from the relation between positions of the liquid droplet DR1 before and after the predetermined period of time.

1-4. Flow of Determination of Waveform of Drive Pulse PD

Figure 4:
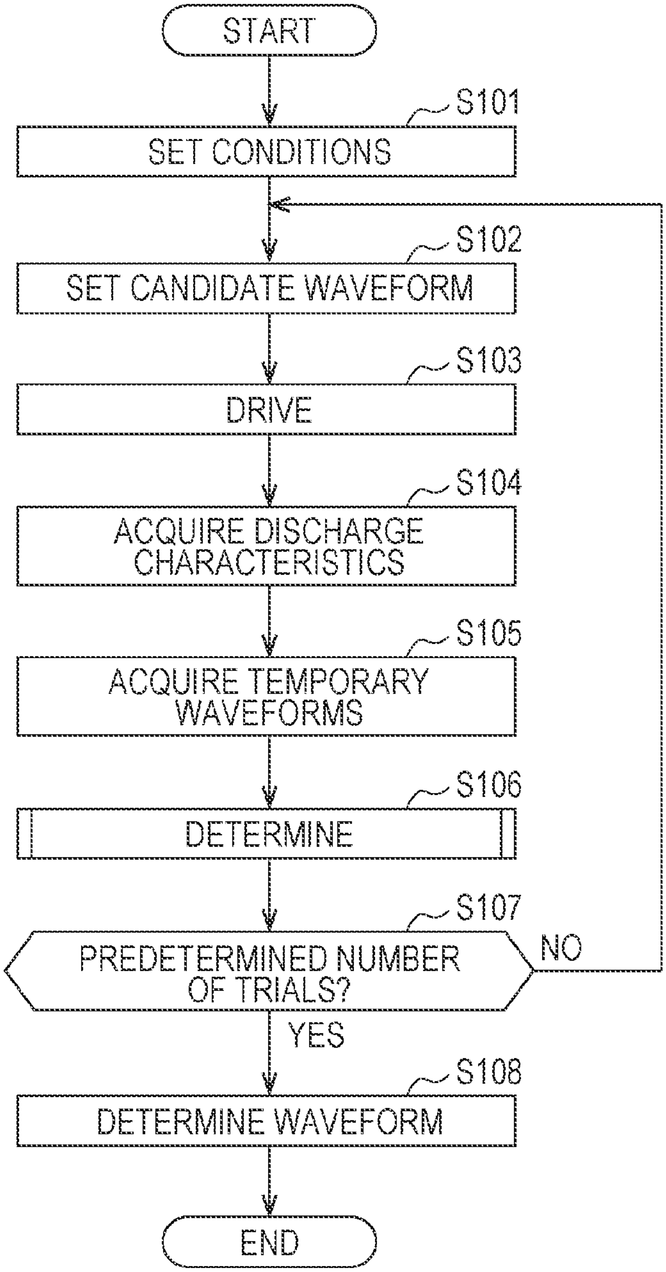
FIG. 4 is a flowchart illustrating a drive waveform determination method according to the first embodiment.

FIG. 4 is a flowchart illustrating a drive waveform determination method according to the first embodiment. As illustrated in FIG. 4, in step S101, which is an example of "first step", in response to, for example, input from a user, the waveform determination section 441 sets conditions of discharge characteristics.

In step S102, the waveform determination section 441 sets a candidate waveform of the drive pulse PD. By way of example and not limitation, the setting is based on the setting content in step S101 or a determination result in step S106 described later. The candidate waveform set in step S102 may be set randomly.

In step S103, the waveform determination section 441 drives the liquid discharge head 210 using the candidate waveform of the drive pulse PD. In step S104, which is an example of "second step", the waveform determination section 441 uses the measurement device 300 as described above to measure discharge characteristics of ink from the liquid discharge head 210, thereby acquiring the discharge characteristics. The acquired discharge characteristics are stored as the discharge characteristic information D1 in the storage circuit 430.

In step S105, which is an example of "fifth step", the waveform determination section 441 acquires temporary waveforms (a temporary waveform at the second trial) by reading the candidate waveform information D2 from the storage circuit 430. The temporary waveforms are candidate waveforms that are already stored as temporary waveforms included in the candidate waveform information D2, through step S106 described later, in the storage circuit 430. Accordingly, at the first trial, the process proceeds to step S106 without the temporary waveform setting.

In step S106, using the conditions set in step S101, the temporary waveforms obtained in step S105, and the discharge characteristics acquired in step S104, the waveform determination section 441 determines whether to use the candidate waveform as a temporary waveform of the drive pulse PD. At the first trial, the candidate waveform is stored as a temporary waveform in the storage circuit 430.

In step S107, the waveform determination section 441 determines whether the number of trials each including step S102 to step S106 described above has reached a predetermined set number. If the number of trials has not reached the predetermined set number, the waveform determination section 441 returns to step S102 described above. Although there is no limitation on the set number, the set number may be from 20 to 700, and specifically from 50 to 500, from the viewpoint of effectively obtaining a suitable waveform of the drive pulse PD. From the viewpoint of obtaining a suitable waveform of the drive pulse PD, the set number may be 20 or greater, and specifically 50 or greater. To keep a balance between the search accuracy of a waveform and the taken time and the consumed ink amount, the set number may be 700 or less, and specifically 500 or less.

However, if the number of trials has reached the predetermined set number, in step S108, which is an example of "sixth step", the waveform determination section 441 determines the waveform of the drive pulse PD by using the candidate waveforms stored as temporary waveforms in the storage circuit 430.

At this point, if the number of temporary waveforms stored in the storage circuit 430 is one, the waveform determination section 441 determines the temporary waveform stored in the storage circuit 430 as the waveform of the drive pulse PD. In contrast, if the number of temporary waveforms stored in the storage circuit 430 is plural, the waveform determination section 441 may determine each of the plurality of temporary waveforms stored in the storage circuit 430 as the waveform of the drive pulse PD or may determine each of one or more temporary waveforms selected by a predetermined way among the plurality of temporary waveforms as the waveform of the drive pulse PD. Information regarding the determined waveform of the drive pulse PD is, for example, displayed on the display device 410.

1-4a. Setting of Conditions of Discharge Characteristics

A specific example of step S101 mentioned above will be described below.

Figure 5:
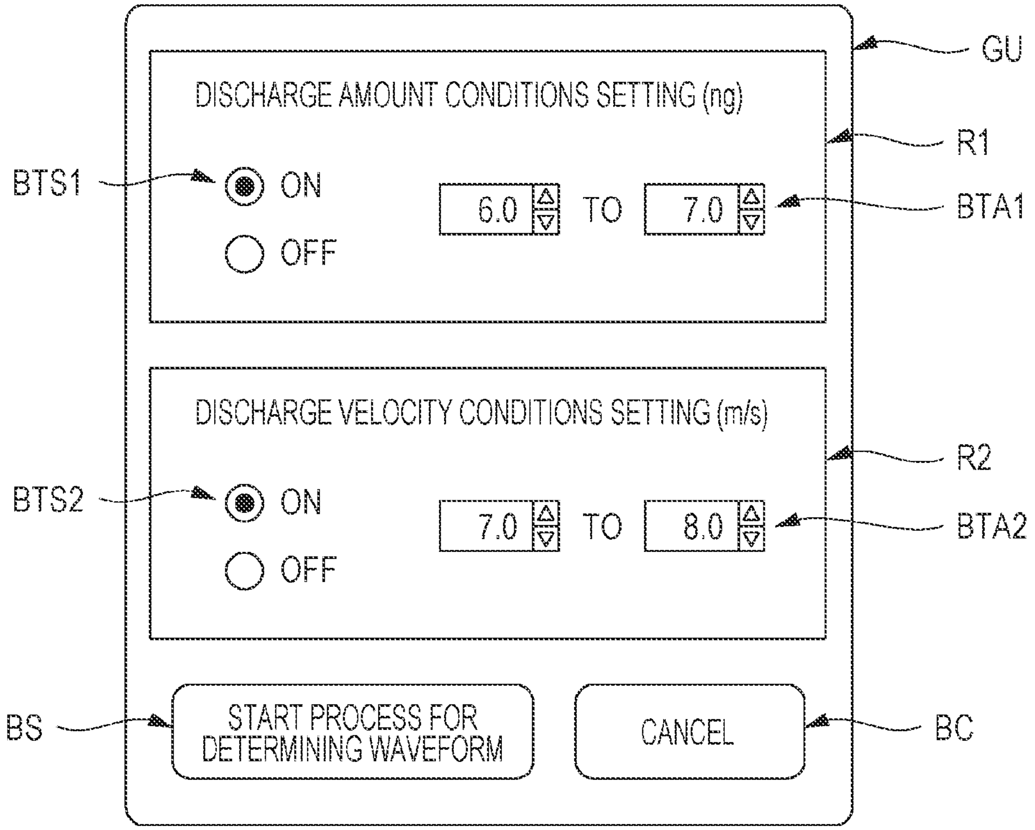
FIG. 5 illustrates a display example for setting conditions of discharge characteristics.

FIG. 5 illustrates a display example for setting conditions of discharge characteristics. In step S101 described above, the waveform determination section 441 causes the display device 410 to display, for example, an image GU for a graphical user interface (GUI) as illustrated in FIG. 5. The image GU includes a display region R1, a display region R2, a button BS, and a button BC.

The display region R1 is a region for setting conditions of a discharge amount, which is an example of "first discharge characteristic". In the example illustrated in FIG. 5, the display region R1 includes buttons BTS1 and a box group BTA1. The buttons BTS1 are buttons for selecting whether to set conditions of the discharge amount. In the example illustrated in FIG. 5, the buttons BTS1 include an ON button for selecting to set the conditions of the discharge amount and an OFF button for selecting not to set the conditions of the discharge amount, and the user selects one of these buttons. The box group BTA1 is a widget group for inputting a discharge amount range as the conditions of the discharge amount. In the example illustrated in FIG. 5, the box group BTA1 is composed of a plurality of spin boxes capable of receiving input of the lower limit value and upper limit value of the range.

The display region R2 is a region for setting conditions of a discharge velocity, which is another example of "first discharge characteristic". In the example illustrated in FIG. 5, the display region R2 includes buttons BTS2 and a box group BTA2. The buttons BTS2 are buttons for selecting whether to set conditions of the discharge velocity. In the example illustrated in FIG. 5, the buttons BTS2 include an ON button for selecting to set the conditions of the discharge velocity and an OFF button for selecting not to set the conditions of the discharge velocity, and the user selects one of these buttons. The box group BTA2 is a widget group for inputting a discharge velocity range as the conditions of the discharge velocity. In the example illustrated in FIG. 5, the box group BTA2 is composed of a plurality of spin boxes capable of receiving input of the lower limit value and upper limit value of the range.

The button BS is a button for starting a process for determining the waveform of the drive pulse PD. In response to an operation on the button BS, under the conditions set in the display region R1 and the display region R2, the process proceeds to step S102 described above, where the process for determining the waveform of the drive pulse PD starts. The button BC is a button for cancelling the process. In response to an operation on the button BC, the process is cancelled as the display of the image GU is finished.

1-4b. Evaluation of Candidate Waveform

A specific example of step S106 mentioned above will be described below.

Figure 6:
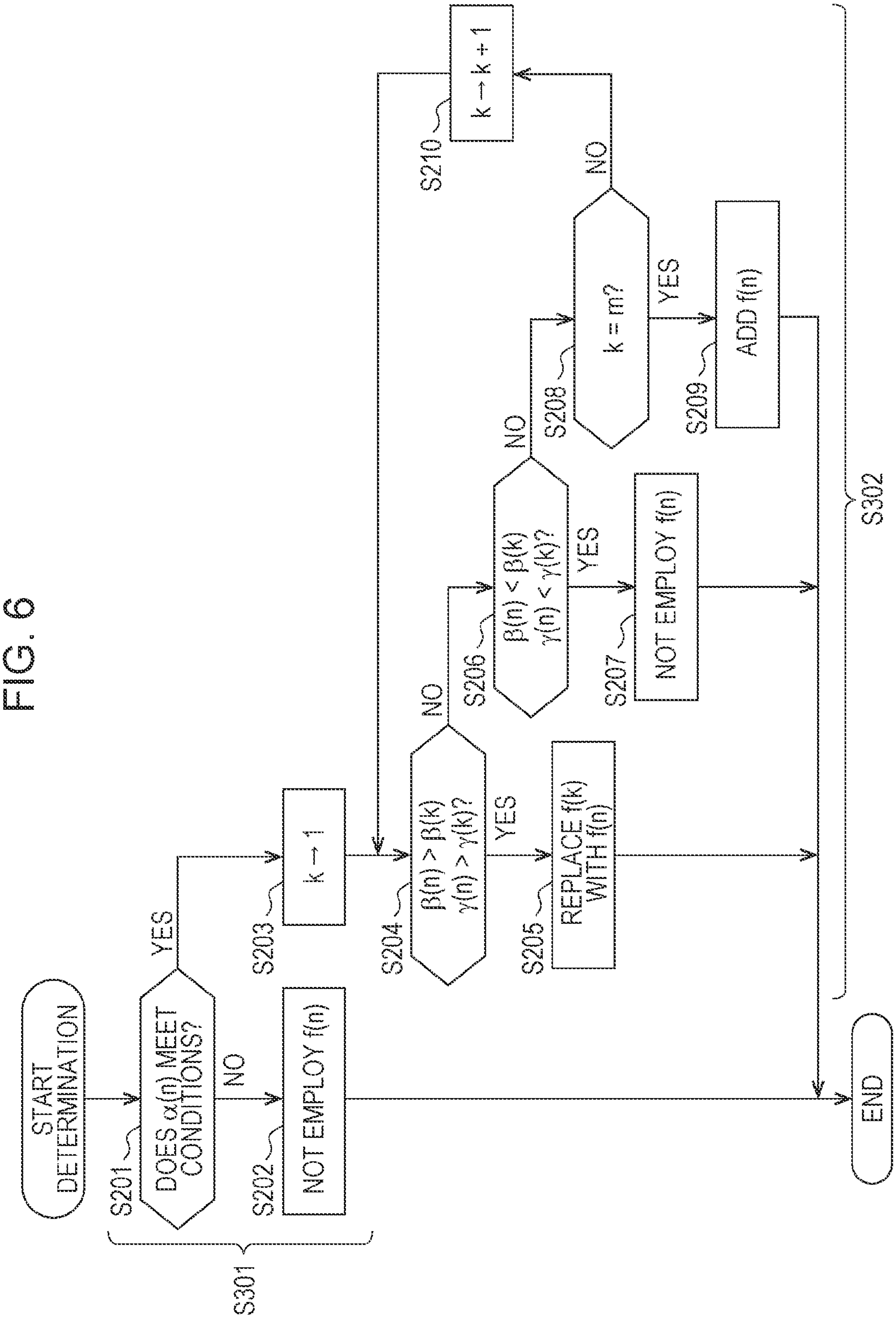
FIG. 6 is a flowchart illustrating determination for a candidate waveform in the first embodiment.

FIG. 6 is a flowchart illustrating determination for a candidate waveform in the first embodiment. In FIG. 6, the "candidate waveform" in an nth trial is denoted by f(n), and m candidate waveforms stored, as "temporary waveforms" that are acquisition targets in step S105, in the storage circuit 430 are denoted by f(k). Here, n is a natural number greater than or equal to 1 and less than or equal to the set number in step S107 described above. Here, m is a natural number from 0 to n−1 and k is a natural number from 1 to m.

In FIG. 6, the first discharge characteristic measured when the candidate waveform f(n) is used as the waveform of the drive pulse PD is denoted by α(n), and the first discharge characteristic measured when the candidate waveform f(k) is used as the waveform of the drive pulse PD is denoted by α(k). Similarly, the second discharge characteristic measured when the candidate waveform f(n) is used as the waveform of the drive pulse PD is denoted by β(n), and the second discharge characteristic measured when the candidate waveform f(k) is used as the waveform of the drive pulse PD is denoted by β(k). Additionally, the third discharge characteristic measured when the candidate waveform f(n) is used as the waveform of the drive pulse PD is denoted by γ(n), and the third discharge characteristic measured when the candidate waveform f(k) is used as the waveform of the drive pulse PD is denoted by γ(k). In FIG. 6, an inequality sign "<" or ">" indicates that the larger characteristic is superior.

As illustrated in FIG. 6, step S106 mentioned above includes step S301, which is an example of "third step", and step S302, which is an example of "fourth step". Step S301 determines whether the first discharge characteristic α(n) meets the conditions set in step S101. If it is determined in step S301 that the conditions are met, step S302 evaluates the candidate waveform f(n) by performing a superior comparison using the second discharge characteristic β(n), the second discharge characteristic β(k), the third discharge characteristic γ(n), and the third discharge characteristic γ(k). These steps will be described in detail below with reference to FIG. 6.

In step S301, as illustrated in FIG. 6, first, in step S201, the waveform determination section 441 determines whether the first discharge characteristic α(n) meets the conditions set in step S101 mentioned above.

If the conditions are not met, in step S202, the waveform determination section 441 does not store the candidate waveform f(n) as a temporary waveform, which is an acquisition target in step S105, in the storage circuit 430, and proceeds step S107 described above.

If, however, the conditions are met, step S302 is performed. Specifically, if the conditions are met, first, in step S203, the waveform determination section 441 sets k to one. In step S204, the waveform determination section 441 determines whether the second discharge characteristic β(n) is superior to the second discharge characteristic β(k) and whether the third discharge characteristic γ(n) is superior to the third discharge characteristic γ(k). That is, in step S204, it is determined whether the candidate waveform f(n) is completely superior to the candidate waveform f(k).

If the determination result in step S204 is affirmative, in step S205, the waveform determination section 441 excludes the candidate waveform f(k) as the acquisition target in step S105 and, instead, stores the candidate waveform f(n) as the acquisition target in step S105 in the storage circuit 430, and then proceeds to step S107 described above.

However, if the determination result in step S204 is negative, in step S206, the waveform determination section 441 determines whether the second discharge characteristic β(n) is inferior to the second discharge characteristic β(k) and whether the third discharge characteristic γ(n) is inferior to the third discharge characteristic γ(k). That is, in step S206, it is determined whether the candidate waveform f(k) is completely inferior (non-dominant) to the candidate waveform f(n).

If the determination result in step S206 is affirmative, in step S207, the waveform determination section 441 does not store the candidate waveform f(n) as a temporary waveform, which is the acquisition target in step S105, in the storage circuit 430, and proceeds to step S107 described above.

However, if the determination result in step S206 is negative, in step S208, the waveform determination section 441 determines whether k=m. Since the determination results are negative both in step S204 and in step S206, the relation of the candidate waveform f(n) to the candidate waveform f(k) is as follows. The candidate waveform f(n) is superior to the candidate waveform f(k) in one of the second discharge characteristic and the third discharge characteristic but inferior in the other. That is, the state of the candidate waveform f(n) with respect to the candidate waveform f(k) is Pareto optimal. When k=m, the relations of the candidate waveform f(n) to all of the m candidate waveforms f(1) to f(m) are those mentioned above.

If the determination result in step S208 is affirmative, in step S209, the waveform determination section 441 does not exclude the candidate waveform f(k) as the acquisition target in step S105 and stores the candidate waveform f(n) as an acquisition target in step S105 in the storage circuit 430, and then proceeds to step S107 described above.

However, if the determination result in step S208 is negative, in step S210, the waveform determination section 441 sets k to k+1 and then proceeds to step S204 described above.

Step S302 described above is repeated and thus the m candidate waveforms f(1) to f(m) in which the first discharge characteristic α(n), the second discharge characteristic β(n), and the third discharge characteristic γ(n) meet the desired conditions are stored as temporary waveforms in the storage circuit 430. Therefore, in step S108, by using the temporary waveforms as evaluation results in step S302, the waveform of the drive pulse PD is determined in which the first discharge characteristic α(n), the second discharge characteristic β(n), and the third discharge characteristic γ(n) meet the desired conditions.

As described above, the drive waveform determination system 100 includes the liquid discharge head 210 and the processing circuit 440. The liquid discharge head 210 includes the piezoelectric elements 211, which are examples of "drive element" for discharging ink, which is an example of "liquid". The processing circuit 440 performs a process for determining a waveform of the drive pulse PD to be applied to the piezoelectric elements 211, using the first discharge characteristic α(n) and the second discharge characteristic β(n) different from the first discharge characteristic α(n).

As described above, the processing circuit 440 executes step S101, which is an example of "first step", step S104, which is an example of "second step", step S301, which is an example of "third step", step S302, which is an example of "fourth step", and step S108, which is an example of "sixth step". That is, the processing circuit 440 executes the drive waveform determination method including these steps.

Step S101 sets conditions of the first discharge characteristic α(n). Step S104 acquires the first discharge characteristic α(n) and the second discharge characteristic β(n) that are measured when the candidate waveform f(n) is used as the waveform of the drive pulse PD. Step S301 determines whether the first discharge characteristic α(n) meets the conditions set in step S101. If it is determined in step S301 that the conditions are met, step S302 evaluates the candidate waveform f(n) by performing a superior comparison using the second discharge characteristic β(n). Step S108 determines the waveform of the drive pulse PD by using candidate waveforms stored as the acquisition targets and stored at this point in the storage circuit 430. The relation among the candidate waveforms in step S108 is Pareto optimal. In determining the drive pulse PD from among these candidate waveforms, the drive pulse PD may be selected by the user or may be automatically selected. When, in step S108, the user determines the drive pulse PD from among the candidate drive waveforms, a step of causing the display device 410 to display candidate waveforms that are stored in the storage circuit 430 and the relation among which is Pareto optimal may be added before step S108. In the added step, only the discharge characteristics of candidate waveforms the relation among which is Pareto optimal may be displayed as a scatter diagram. In the added step, the discharge characteristics of candidate waveforms the relation among which is Pareto optimal and the discharge characteristics of the other candidate waveforms may be simultaneously displayed as a scatter diagram in which symbols differ in at least some of the items such as color, size, and type.

In this way, in the present embodiment, steps S103 to S107 in FIG. 4 are repeated and thereby an optimization process is performed. In particular, a multiobjective optimization process is performed as the optimization process. Thereby, the candidate waveforms the relation among which is Pareto optimal may be obtained.

In the drive waveform determination system 100 described above, the waveform of the drive pulse PD may be automatically determined by execution of these steps. Therefore, burdens in time and cost on the user in determining the drive pulse PD may be reduced. In addition, when the first discharge characteristic α(n) meets the conditions, a superior comparison is performed using the second discharge characteristic β(n), that is, the optimization process is performed under the condition where a restriction is imposed on the first discharge characteristic α(n). Thus, after the first discharge characteristic α(n) meets the conditions, an optimal solution for the second discharge characteristic β(n) is obtained. Therefore, by using the optimal solution, the waveform of the drive pulse PD that meets the desired first discharge characteristic α(n) and second discharge characteristic β(n) may be obtained.

In contrast, if the first discharge characteristic α(n) is also subjected to a superior comparison, the first discharge characteristic α(n) measured when the determined waveform of the drive pulse PD would be likely to greatly deviate from a desired value. For example, when the first discharge characteristic α(n) is not a characteristic simply indicating that the larger or smaller, the better, such as when the first discharge characteristic α(n) is a discharge characteristic such as the discharge amount or discharge velocity of ink from the liquid discharge head 210, this deviation would be likely to occur.

The drive waveform determination method in the present embodiment does not perform step S302 if it is determined in step S301 that the conditions are not met, as described above. Therefore, the waveform of the drive pulse PD that meets the conditions described above may be efficiently determined.

In addition, as described above, step S104 further acquires the third discharge characteristic γ(n) different from the first discharge characteristic α(n) and the second discharge characteristic β(n) when the candidate waveform f(n) is used as the waveform of the drive pulse PD. If it is determined in step S301 that the conditions are met, step S302 evaluates the candidate waveform f(n) by performing a dominant comparison using the second discharge characteristic β(n) and the third discharge characteristic γ(n). That is, a multiobjective optimization is performed as the optimization. Therefore, an optimal solution for the second discharge characteristic β(n) and the third discharge characteristic γ(n) is obtained after the first discharge characteristic α(n) meets the conditions. Therefore, by using the optimal solution, the waveform of the drive pulse PD that meets the desired first discharge characteristic α(n), the second discharge characteristic β(n), and the third discharge characteristic γ(n) may be obtained.

The drive waveform determination method in the present embodiment includes step S105, which is an example of "fifth step", as mentioned above. Step S105 acquires, as a temporary waveform of the drive pulse PD, the candidate waveform f(k) that is an acquisition target stored in the storage circuit 430. Step S302 evaluates the candidate waveform f(n) by performing superior comparisons using the second discharge characteristic β(k) and the third discharge characteristic γ(k) of this temporary waveform in addition to the second discharge characteristic β(n) and the third discharge characteristic γ(n) of the candidate waveform f(n). Thereby, a Pareto optimal solution may be obtained as the optimal solution.

Specifically, as described above, when the second discharge characteristic β(n) of the candidate waveform f(n) is superior to the second discharge characteristic β(k) of the temporary waveform and when the third discharge characteristic γ(n) of the candidate waveform f(n) is superior to the third discharge characteristic γ(k) of the temporary waveform, step S302 excludes the temporary waveform f(k) as the acquisition target in step S105 and stores the candidate waveform f(n) as an acquisition target in step S105 in the storage circuit 430.

In addition, as described above, when the second discharge characteristic β(n) of the candidate waveform f(n) is inferior to the second discharge characteristic β(k) of the temporary waveform and when the third discharge characteristic γ(n) of the candidate waveform f(n) is inferior to the third discharge characteristic γ(k) of the temporary waveform, step S302 does not store the candidate waveform f(n) as an acquisition target in step S105 in the storage circuit 430.

Furthermore, as described above, when the second discharge characteristic β(n) of the candidate waveform f(n) is superior to the second discharge characteristic β(k) of the temporary waveform and when the third discharge characteristic γ(n) of the candidate waveform f(n) is inferior to the third discharge characteristic γ(k) of the temporary waveform, step S302 does not exclude the temporary waveform f(k) as the acquisition target in step S105 and stores the candidate waveform f(n) as an acquisition target in step S105 in the storage circuit 430.

In addition, as described above, step S108 performs processing including step S104, step S301, and step S302 a plurality of times, and then determines the waveform of the drive pulse PD by using the candidate waveforms f(k) stored as acquisition targets in step S105 in the storage circuit 430. Therefore, compared with the case where this processing is performed only once, an optimal waveform of the drive pulse PD is obtained.

As described above, step S101 sets an allowable range of the first discharge characteristic α(n) as the conditions described above. Therefore, the drive pulse PD that meets the allowable range may be obtained.

As described above, step S101 may select whether to set the conditions described above. This enables appropriate conditions of the first discharge characteristic α(n) to be manually set by the user if the user has knowledge about determination of the drive pulse PD. In contrast, this enables conditions of the first discharge characteristic α(n) to be automatically set, but not to be manually set by the user, if the user has no knowledge about determination of the drive pulse PD. Therefore, there is an advantage in that the usability is excellent. In addition, when the conditions described above include a plurality of conditions, one or more of the plurality of conditions may be selected as desired.

In the drive waveform determination method in the present embodiment, as described above, step S101 causes the display device 410 to display the image GU, which is an example of "information" for receiving an instruction regarding the conditions described above from the user, and then sets the conditions described above according to the instruction. Therefore, there is an advantage in that the usability is excellent compared with a configuration in which this setting is performed without display of a display device.

As described above, examples of the discharge characteristics of ink from the liquid discharge head 210 include the discharge amount of ink from the liquid discharge head 210, the discharge velocity of ink from the liquid discharge head 210, the discharge angle of ink from the liquid discharge head 210, the amount of production of satellites following the main droplet of ink from the liquid discharge head 210, and the drive frequency of the liquid discharge head 210. Among these discharge characteristics, the first discharge characteristic α(n) in the present embodiment is the characteristic of one or both of the discharge amount of ink from the liquid discharge head 210 and the discharge velocity of ink from the present embodiment 210. This characteristic is not a characteristic that may only be large or small, and therefore is not suitable for a superior/dominant comparison. The characteristic is easy to be quantified and is easy to be grasped by the user, and therefore is suitable so that the allowable range of the first discharge characteristic α(n) is manually set by the user. In contrast, the second discharge characteristic β(n) or the third discharge characteristic γ(n) in the present embodiment is the discharge angle of ink from the liquid discharge head 210, the amount of production of satellites following the main droplet of ink from the liquid discharge head 210, or the drive frequency of the liquid discharge head 210. The second discharge characteristic β(n) and the third discharge characteristic γ(n) in such a manner may have a trade-off relation in which if one characteristic is superior, the other characteristic is inferior, and therefore are suitable for superior comparison, that is, multiobjective optimization.

2. Second Embodiment

A second embodiment of the present disclosure will be described below. In the embodiment illustrated below, elements with operations and functions similar to those in the first embodiment are denoted by reference numerals borrowed from the description in the first embodiment and detailed description of each of the elements is not described as appropriate.

Figure 7:
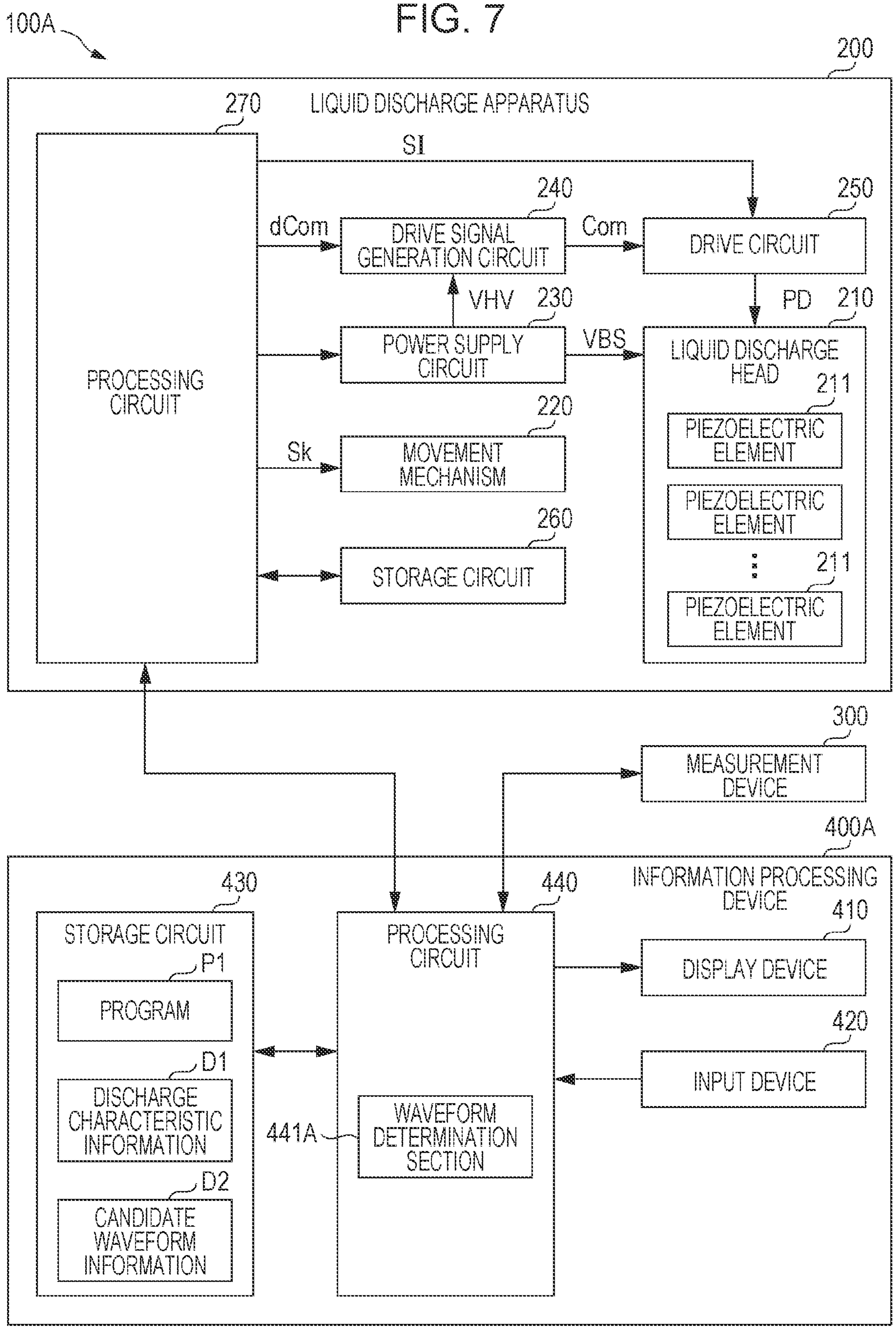
FIG. 7 is a diagram illustrating an exemplary configuration of a drive waveform determination system according to a second embodiment.

FIG. 7 is a diagram illustrating an exemplary configuration of a drive waveform determination system according to the second embodiment. A drive waveform determination system 100A is the same as the drive waveform determination system 100 in the first embodiment described above, except that the drive waveform determination system 100A includes an information processing device 400A instead of the information processing device 400. The information processing device 400A is the same as the information processing device 400 in the first embodiment described above, except that the information processing device 400A uses a program P1, which is an example of "drive waveform determination program", instead of the program P.

The processing circuit 440 functions as a waveform determination section 441A by reading the program P1 from the storage circuit 430 and executing the program P. The waveform determination section 441A is the same as the waveform determination section 441 in the first embodiment described above, except that processing about evaluation of candidate waveforms differs from that in the waveform determination section 441. Processing in the waveform determination section 441A will be described below.

Figure 8:
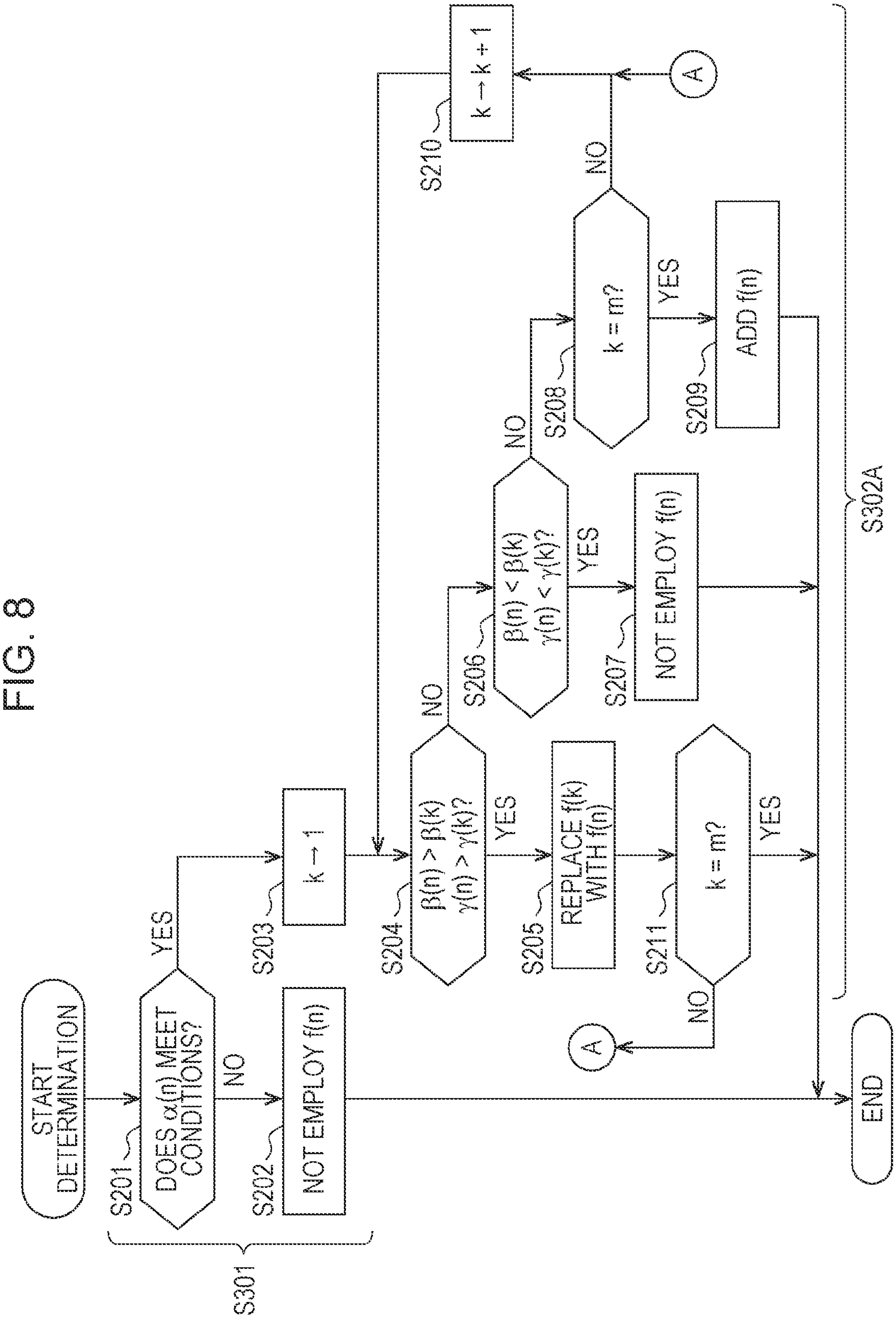
FIG. 8 is a flowchart illustrating determination for a candidate waveform in the second embodiment.

FIG. 8 is a flowchart illustrating determination for a candidate waveform in the second embodiment. This determination is the same as the determination in the first embodiment described above, except that this determination performs step S302A, instead of step S302, as an example of "fourth step". Step S302A is the same as step S302 in the first embodiment described above, except that step S211 is added. As illustrated in FIG. 8, in step S211 after step S205, the waveform determination section 441A determines whether k=m.

Here, in step S205, under the condition where k=k, the candidate waveform f(k) is only replaced with the candidate waveform f(n). In step S211, if k=m, replacement of the candidate waveform f(k) has not been performed when k=1 to m−1, earlier than when k=m, and it is finalized that the candidate waveform f(n) is completely superior to the candidate waveform f(k) when k=m. Accordingly, if the determination result in step S211 is affirmative, step S302A is complete, and the process proceeds to step S107 described above.

However, if the determination result in step S211 is negative, the process proceeds to step S210. As a result, even after, under the condition where k=k, the candidate waveform f(k) has been replaced with the candidate waveform f(n), that is, when k=k+1 to m, the candidate waveform f(k) may be replaced with the candidate waveform f(n). However, when, in step S205 or step S209, the same candidate waveform f(n) as before is stored in the storage circuit 430, only one candidate waveform f(n) is stored in the storage circuit 430.

According to the second embodiment described above, as according to the first embodiment described above, the waveform of the drive pulse PD may be determined while burdens in time and cost on the user are reduced.

3. Third Embodiment

Figure 9:
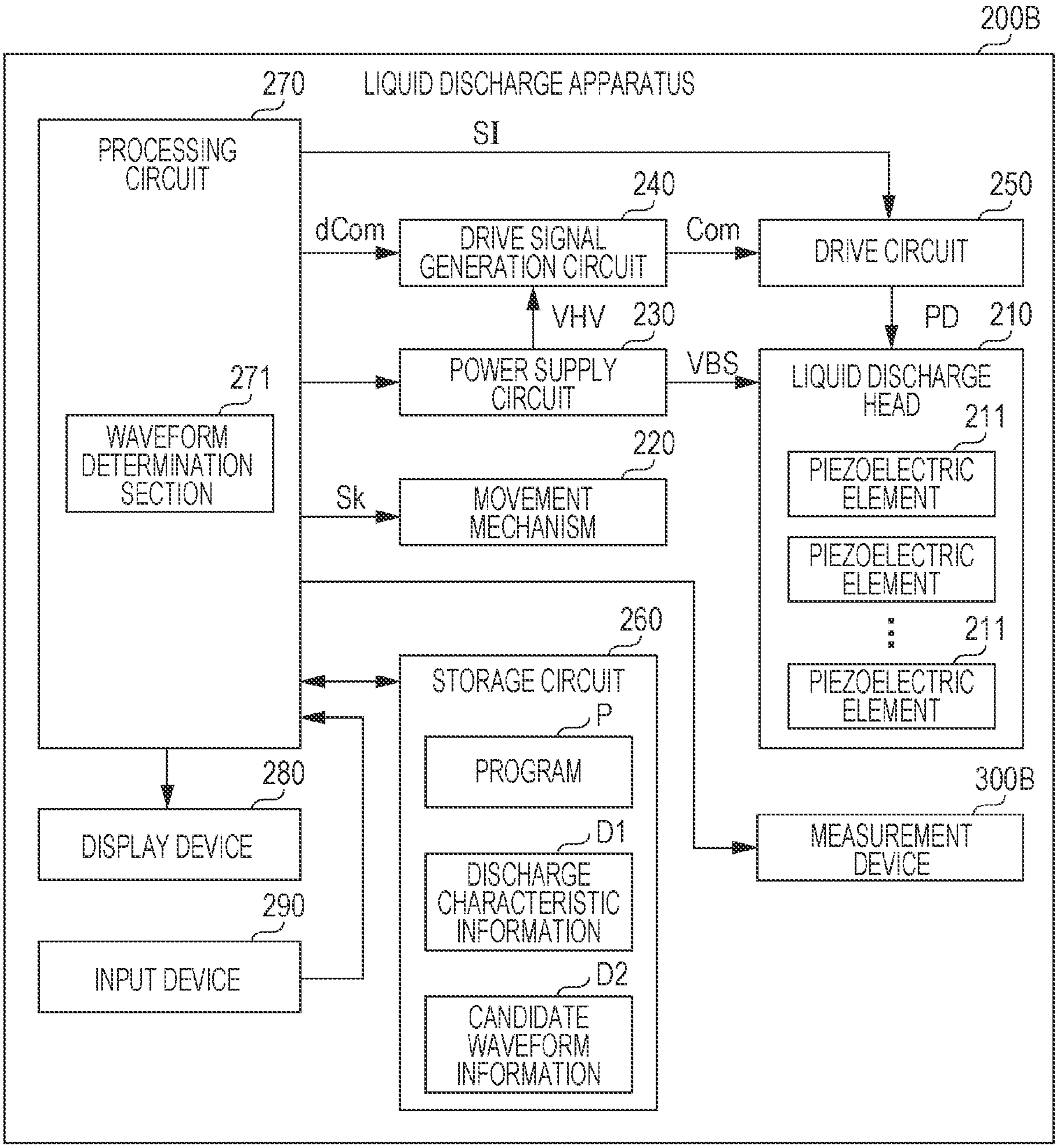
FIG. 9 is a diagram illustrating an exemplary configuration of a liquid discharge apparatus according to a third embodiment.

FIG. 9 is a diagram illustrating an exemplary configuration of a liquid discharge apparatus 200B according to a third embodiment. The liquid discharge apparatus 200B is the same as the liquid discharge apparatus 200 described above, except that the liquid discharge apparatus 200B includes a display device 280, an input device 290, and a measurement device 300B and executes the program P.

The display device 280 has the same configuration as the display device 410 in the first embodiment described above. The input device 290 has the same configuration as the input device 420 in the first embodiment described above. The measurement device 300B has the same configuration as the measurement device 300 in the first embodiment described above. At least one of the display device 280, the input device 290, and the measurement device 300B may be provided outside the liquid discharge apparatus 200B.

In the storage circuit 260 in the present embodiment, the program P, the discharge characteristic information D1, and the candidate waveform information D2 are stored. The processing circuit 270 in the present embodiment is an example of a computer and functions as a waveform determination section 271 by executing the program P.

The waveform determination section 271 determines the waveform of the drive pulse PD, as is the case in the waveform determination section 441 in the first embodiment described above. As described above, the processing circuit 270 executes the drive waveform determination method, as is the case in the processing circuit 440 in the first embodiment described above.

According to the third embodiment described above, as according to the first embodiment described above, the waveform of the drive pulse PD may be determined while burdens in time and cost on the user are reduced. In the present embodiment, the program P1 in the second embodiment described above may be used instead of the program P.

4. Modifications

Although the drive waveform determination method, the drive waveform determination program, the liquid discharge apparatus, and the drive waveform determination system of the present disclosure have been described above by using the embodiments with reference to the drawings, the present disclosure is not limited to this. The configurations of elements of the present disclosure may be replaced with any configurations that perform functions similar to those in the embodiments described above, and any configurations may be added.

4-1. First Modification

Although, in the embodiments described above, the configuration in which a so-called multiobjective optimization process of performing a dominant comparison using the second discharge characteristic and the third discharge characteristic in the fourth step is performed is illustrated, the present disclosure is not limited to this configuration. For example, a so-called single-objective optimization in which a superior comparison is performed using only the second discharge characteristic in the fourth step may be used. In addition, the fourth step may evaluate a candidate waveform not by performing optimization using the second discharge characteristic but by performing a search within the range of conditions of the first discharge characteristic. For this search, for example, a Markov chain Monte Carlo (MCMC) method is used.

4-2. Second Modification

Although, in the embodiments described above, the configuration in which the program P is executed by the processing circuit provided in the same device as that of the storage circuit in which the program P is installed is illustrated, the present disclosure is not limited to this configuration. The program P may be executed by a processing circuit provided a device different from that of the storage circuit in which the program P is installed. For example, as in the first embodiment, the program P stored in the storage circuit 430 of the information processing device 400 may be executed by the processing circuit 270 in the liquid discharge apparatus 200.

What is claimed is:

1. A drive waveform determination method for determining, using a first discharge characteristic and a second discharge characteristic different from the first discharge characteristic, a waveform of a drive pulse to be applied to a drive element provided in a liquid discharge head that discharges a liquid, the drive waveform determination method comprising:
   - a first step of setting a condition of the first discharge characteristic;
   - a second step of acquiring the first discharge characteristic and the second discharge characteristic that are measured when a candidate waveform is used as the waveform of the drive pulse;
   - a third step of determining whether the first discharge characteristic meets the condition; and
   - a fourth step of, when it is determined in the third step that the condition is met, evaluating the candidate waveform by performing a superior comparison using the second discharge characteristic,
   - wherein the waveform of the drive pulse is determined by an optimization process in which at least the second step, the third step, and the fourth step are repeated.

2. The drive waveform determination method according to claim 1, wherein the fourth step is not performed when it is determined in the third step that the condition is not met.

3. The drive waveform determination method according to claim 1, wherein the second step further acquires a third discharge characteristic measured when the candidate waveform is used as the waveform of the drive pulse, the third discharge characteristic being different from the first discharge characteristic and the second discharge characteristic, when it is determined in the third step that the condition is met, the fourth step evaluates the candidate waveform by performing a dominant comparison using the second discharge characteristic and the third discharge characteristic, and a multiobjective optimization process is performed as the optimization process.

4. The drive waveform determination method according to claim 3, further comprising a fifth step of acquiring an acquisition target stored in a storage circuit as a temporary waveform of the drive pulse, wherein the fourth step evaluates the candidate waveform by performing a dominant comparison using the second discharge characteristic and the third discharge characteristic of the temporary waveform in addition to the second discharge characteristic and the third discharge characteristic of the candidate waveform.

5. The drive waveform determination method according to claim 4, wherein when the second discharge characteristic of the candidate waveform is superior to the second discharge characteristic of the temporary waveform and when the third discharge characteristic of the candidate waveform is superior to the third discharge characteristic of the temporary waveform, the fourth step excludes the temporary waveform from an acquisition target in the fifth step and stores the candidate waveform as an acquisition target in the fifth step in the storage circuit.

6. The drive waveform determination method according to claim 4, wherein when the second discharge characteristic of the candidate waveform is inferior to the second discharge characteristic of the temporary waveform and when the third discharge characteristic of the candidate waveform is inferior to the third discharge characteristic of the temporary waveform, the fourth step does not store the candidate waveform as an acquisition target in the fifth step in the storage circuit.

7. The drive waveform determination method according to claim 4, wherein when the second discharge characteristic of the candidate waveform is superior to the second discharge characteristic of the temporary waveform and when the third discharge characteristic of the candidate waveform is inferior to the third discharge characteristic of the temporary waveform, the fourth step does not exclude the temporary waveform from an acquisition target in the fifth step and stores the candidate waveform as an acquisition target in the fifth step in the storage circuit.

8. The drive waveform determination method according to claim 4, further comprising a sixth step of, after performing at least the second step, the third step, and the fourth step a plurality of times, determining a waveform of the drive pulse by using the candidate waveform stored as an acquisition target in the fifth step in the storage circuit.

9. The drive waveform determination method according to claim 1, wherein the first step sets, as the condition, an allowable range of the first discharge characteristic.

10. The drive waveform determination method according to claim 1, wherein the first step is configured to select whether to set the condition.

11. The drive waveform determination method according to claim 1, wherein the first step causes a display device to display information for receiving an instruction regarding the condition from a user and then sets the condition according to the instruction.

12. The drive waveform determination method according to claim 1, wherein the first discharge characteristic is a discharge amount of a liquid from the liquid discharge head.

13. The drive waveform determination method according to claim 1, wherein the first discharge characteristic is a discharge velocity of a liquid from the liquid discharge head.

14. The drive waveform determination method according to claim 1, wherein the second discharge characteristic is a discharge angle of a liquid from the liquid discharge head.

15. The drive waveform determination method according to claim 1, wherein the second discharge characteristic is an amount of production of a satellite following a main droplet of a liquid from the liquid discharge head.

16. The drive waveform determination method according to claim 1, wherein the second discharge characteristic is a drive frequency of the liquid discharge head.

17. A non-transitory computer-readable storage medium storing a drive waveform determination program, the drive waveform determination program comprising causing a computer to execute the drive waveform determination method according to claim 1.

18. A liquid discharge apparatus comprising:

a liquid discharge head including a drive element for discharging a liquid; and a processing circuit configured to perform a process of determining, using a first discharge characteristic and a second discharge characteristic different from the first discharge characteristic, a waveform of a drive pulse to be applied to the drive element, wherein the processing circuit is configured to perform a first step of setting a condition of the first discharge characteristic, a second step of acquiring the first discharge characteristic and the second discharge characteristic that are measured when a candidate waveform is used as the waveform of the drive pulse, a third step of determining whether the first discharge characteristic meets the condition, and a fourth step of, when it is determined in the third step that the condition is met, evaluating the candidate waveform by performing an optimization using the second discharge characteristic, and wherein the processing circuit is configured to determine the waveform of the drive pulse by an optimization process in which at least the second step, the third step, and the fourth step are repeated.

19. A drive waveform determination system comprising:

a liquid discharge head including a drive element for discharging a liquid; and a processing circuit configured to perform a process of determining, using a first discharge characteristic and a second discharge characteristic different from the first discharge characteristic, a waveform of a drive pulse to be applied to the drive element, wherein the processing circuit is configured to perform a first step of setting a condition of the first discharge characteristic, a second step of acquiring the first discharge characteristic and the second discharge characteristic that are measured when a candidate waveform is used as the waveform of the drive pulse, a third step of determining whether the first discharge characteristic meets the condition, and a fourth step of, when it is determined in the third step that the condition is met, evaluating the candidate waveform by performing an optimization using the second discharge characteristic, and wherein the processing circuit determines the waveform of the drive pulse by an optimization process in which at least the second step, the third step, and the fourth step are repeated.

* * * * *